United States Patent [19]
Engle

[11] 3,761,945
[45] Sept. 25, 1973

[54] MINI-WIRE CONTROL-SYSTEM

[76] Inventor: Gary W. Engle, 24752 San Doval Ln., Mission Viejo, Calif. 92675

[22] Filed: May 18, 1972

[21] Appl. No.: 254,582

[52] U.S. Cl............ 340/147 T, 340/176, 340/167 P
[51] Int. Cl............................................. H04q 5/06
[58] Field of Search.................... 340/147 R, 147 T, 340/147 P, 172, 176

[56] References Cited

UNITED STATES PATENTS 3,402,404 9/1968 Burley et al. ....................... 340/176

*Primary Examiner*—Donald J. Yusko
*Attorney*—Harvey C. Neinow et al.

[57] ABSTRACT

The present invention relates to a control system that uses a minimal number of distribution lines for interconnecting signal producing circuitry and signal utilization devices. In this way a large plurality of utilization devices may be activated by a suitable number of controllers in the signal producing circuitry; and the actual number of distribution lines is appreciably smaller than either the number of controllers or the number of utilization devices.

Various types of signal producing controllers are shown; and a plurality of utilization devices and their interconnections are discussed, the utilization devices being "tuned" to be activated only by suitably associated control signals.

7 Claims, 9 Drawing Figures

Patented Sept. 25, 1973 | 3,761,945

4 Sheets-Sheet 2

MINI-WIRE CONTROL-SYSTEM

BACKGROUND

It is frequently desired to remotely control the operation of selected utilization devices of various forms (e.g., water sprinklers, lamps, etc.); and a number of control systems have been devised for this purpose. Unfortunately, most of these control systems have serious drawbacks, among which are: the amount of wiring or conduits necessary, the size of the connecting cables and conduits, the complexity of the actuators, the sequence and/or simultanity of operation, the duration of operations, etc.

OBJECTIVES AND DRAWINGS

It is therefore the principal objective of the present invention to provide an improved control system.

It is another objective of the present invention to provide an improved control system that requires a minimal amount of wire and a minimum number of lines.

It is still another objective of the present invention to provide an improved control system requiring extremely simple apparatus.

It is a further objective of the present invention to provide an improved control system that may be easily activated.

It is a still further objective of the present invention to provide an improved control-system that permits sequential operation of selected utilization-devices.

It is a still further objective of the present invention to provide an improved control-system that permits simultaneous operation of selected utilization-devices.

It is a still further objective of the present invention to provide an improved control-system that permits the operation of selected utilization-devices for predetermined time-intervals.

The attainment of these objectives and others will be realized from a study of the following explanation, taken in conjunction with the drawings of which FIG. 1A shows a circuit for producing control-signals;

Figures 3A, 3B:
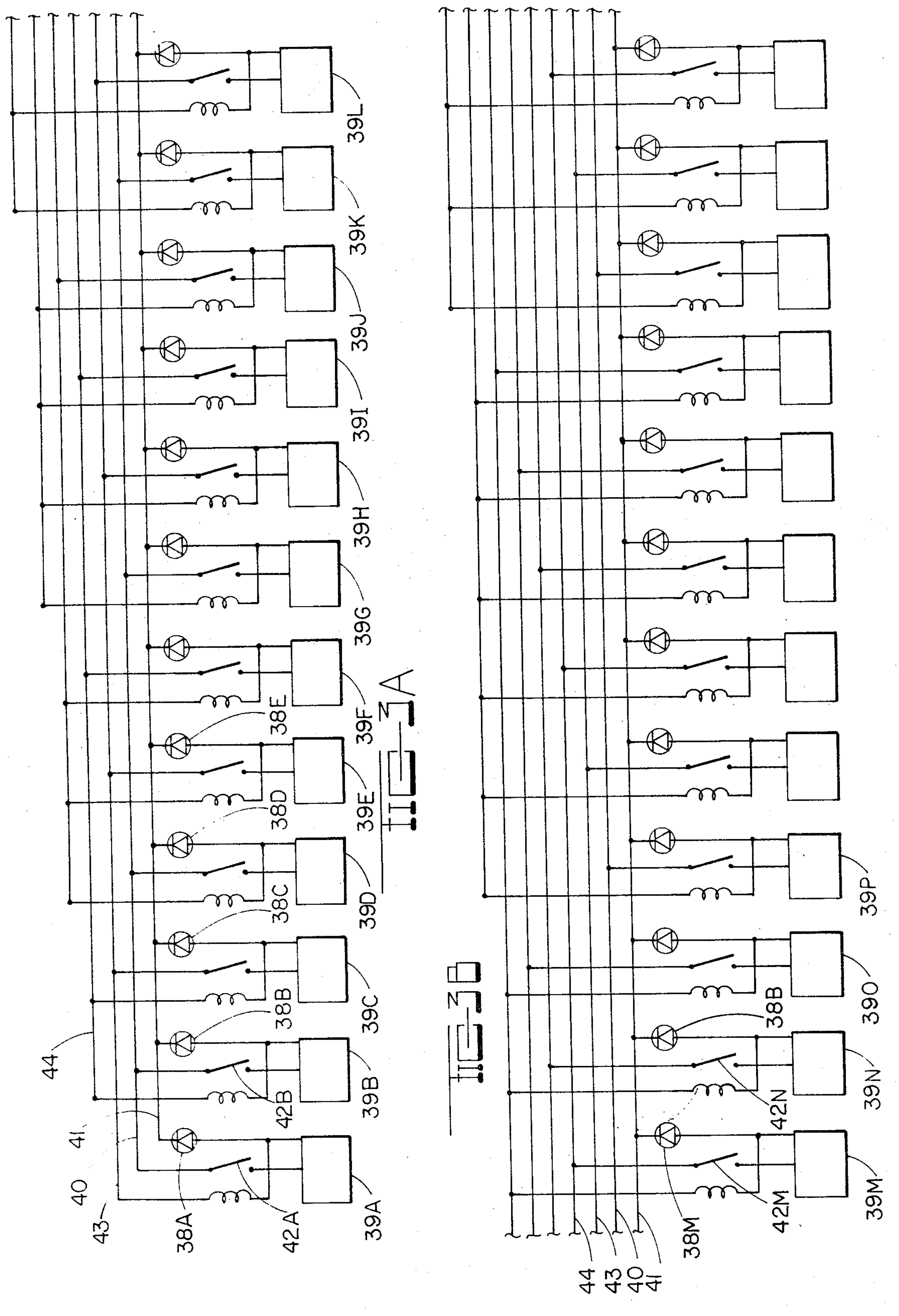

FIGS. 3A; 3B; 4 – 6 show still other circuits for utilizing the control signals.

The several figures show electrical systems. It is to be understood that the invention is equally applicable to hydraulic systems and the terms lines, wires, switches and the like, selected from electrical terminology for clarity, are intended to describe their hydraulic equivalents as well.

INTRODUCTION

As indicated above, water sprinklers for irrigating golf courses are a good example of one usage of the present invention; and the first part of the explanation will therefore be presented in terms of such watering devices. However, the explanation presented in terms of water sprinklers should not be construed as a limitation of the use of the present invention; rather, this explanation should be construed as one of the many uses for the disclosed control system.

In the maintenance of a golf-course, it is necessary to individually water the various portions of the golf course; since, it will be realized, each such portion of the golf course has its own individual water requirements — as controlled by characteristics such as type and height of grass, drainage, dew accumulation, amount of usage, exposure to sun and wind, etc. Some of these golf course areas may have to be watered quite deeply, or watered often; whereas other areas may have to be watered only lightly, or only occasionally.

It has been found desirable to water the golf courses between 10:00 p.m. and 4 a.m.; as this timing permits the golf course to be reasonably dry for the early golfer and/or for the heat of the day. Moreover, since there is such a large area to be watered, and since there is such a relatively short time to do so, the water-sprinklers handle a tremendous volume of water — frequently using 6-inch water-pipes that are supplied from a local lake. Thus, it becomes necessary to "program" the watering of the various portions of a golf course.

It has therefore become the practice to provide a large number of water-sprinklers (often as many as two or three hundred) located in such a manner as to provide the desired water-coverage; and to program the watering-sequence in which the sprinklers are activated, the sprinklers generally being operated singly.

In general, a water-pipe is routed to each of the sprinklers, and an electrically-operated control-valve is used to turn the various sprinklers on and off. Ordinarily, a pair of control-wires is routed from a control-panel to each control-valve; and, as may be understood, a tremendous amount of wire is needed for a large-sized golf course.

There have been a number of attempts to minimize the amount of wire needed; many of these attempts using expedients such as a common "ground" or "return" wire (since the newly-introduced plastic water-pipe negates the use of the water-pipe itself as a return-wire). Unfortunately, most of these improvements have not been particularly successful.

The Controller

Figures 1A, 1B:
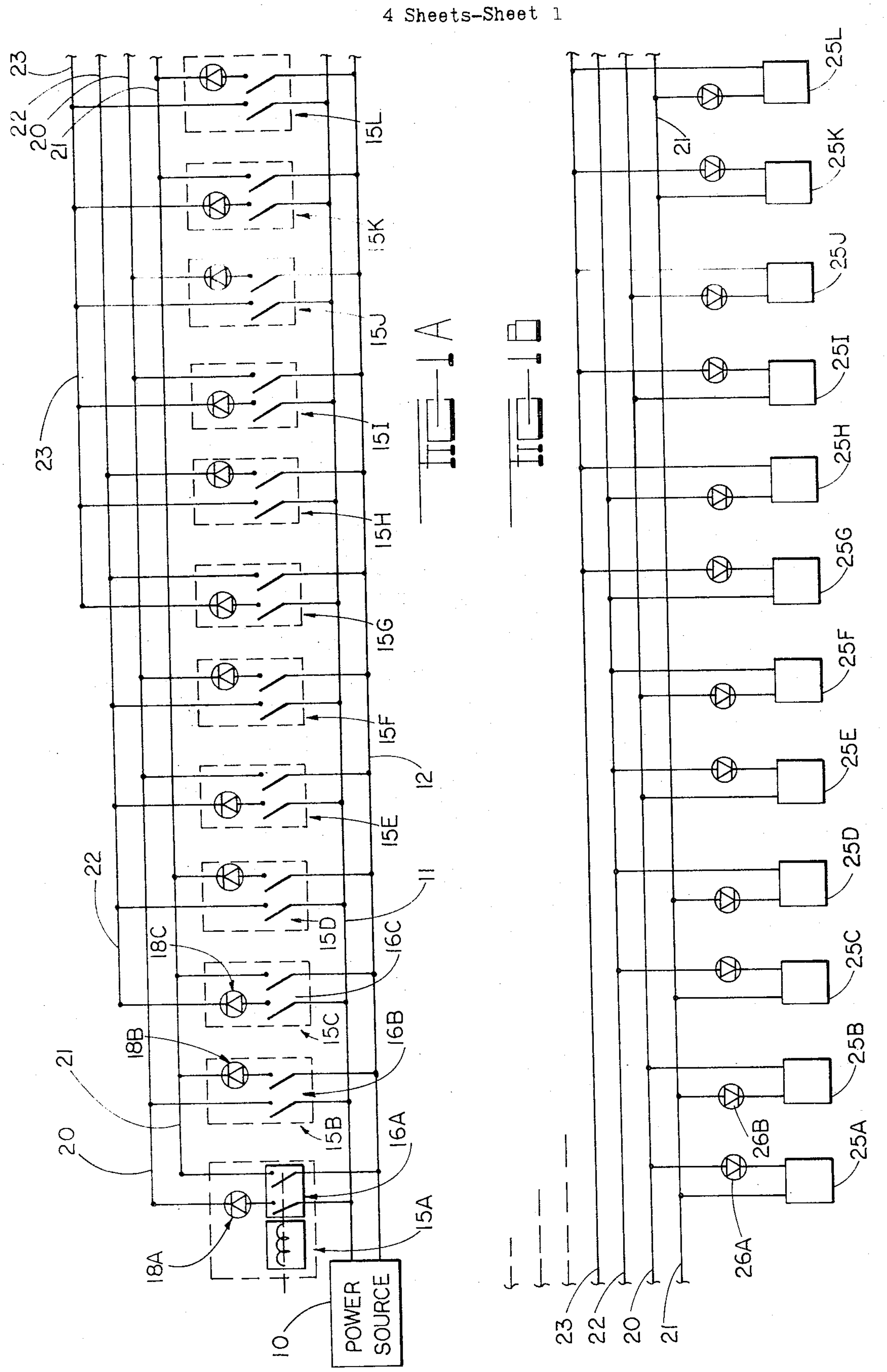
FIG. 1B shows a circuit for utilizing the control-signals.

One way of producing control-signals is illustrated in FIG. 1A which shows a power-source 10 that produces alternating current (A.C.) of a suitable voltage; a pair of power-wires 11 and 12 being shown to emerge from the power source 10. It is a well-known property of A. C. power-sources that each of the power-wires 11 and 12 cyclically and alternately becomes "positive" and "negative" relative to the other power-wire. The use of this characteristic will be discussed more fully later.

FIG. 1A shows a controller 15A to comprise an actuator 16A, such as a "normally open" double-pole switch, electrically connected to power-wires 11 and 12. When actuator 16A is "closed," it applies power from power-wires 11 and 12 in a manner to be discussed later. Actuator 16A, and thus controller 15A, may be actuated in any suitable manner — i.e., manually; by a timing mechanism; by a magnetic force, electrically by a coil as indicated; etc.

It will be noted, from FIG. 1A, that controller 15A comprises an electronic component 18A known as a "rectifier" that is part of an electrical-connection between one of the power-wires (say 11) and a first "distribution wire" (say 20) of a set of distribution-wires. Rectifier 18A is normally electrically non-conductive, but becomes electrically-conductive when a suitable voltage is impressed across it. Rectifier 18A is shown to be "poled" in such a direction that when power-wire 11 is positive, rectifier 18A permits electricity to flow from power-wire 11 to the distribution-wire 20.

When the controller 15A is closed, its operation is as follows. At those times when power-wire 11 is instantaneously positive (which happens cyclically as mentioned above), the voltage impressed by the power-source 10 causes the rectifier 18A to become electrically-conductive; and electricity then flows from power-wire 11, through the rectifier 18A, to the distribution-wire 20. Thus, distribution-wire 20 attains a positive-polarity.

Simultaneously, the instantaneous negative-polarity on power-wire 12 is transmitted through the closed controller 15A to a second distribution-wire 21.

Thus, closing the controller 15A produces an associated control-signal that has three signal-component characteristics. First of all, closing the controller 15A causes it to select a distribution-wire 20 to be the "control wire" that is to transmit the control-signal associated with controller 15A. Second, closing the controller 15A causes it to select the distribution-wire 21 to be the return-wire for the control-signal associated with controller 15A. Third, closing the controller 15A causes its associated control-signal to have a positive-polarity on control-wire 20. Thus, the power-source 10 powers controller 15A to produce an associated control-signal that may be identified as "Positive 20/Negative 21" (P20/N21).

As the power-source 10 goes through its inherent A. C. operation, the instantaneous polarities and voltages on its power-wires 11 and 12 vary their relationships. As this happens, the voltage across the rectifier 18A decreases to a value at which the rectifier 18A assumes its normal state of electrical non-conductivity. At this time, the control-signal is terminated for an extremely short period of time (typically for about one one hundred-twentieth of a second); after which the control-signal is automatically reestablished. This intermittent production of the control-signal continues as long as controller 15A is closed.

However, the extinguishment of the control-signal is for such an extremely short time-interval that — to all effects and purposes — it is a continuously-produced control-signal.

When the actuator 16A of controller 15A is open, it "de-couples" the controller 15A from the distribution-wires; and prevents the production of control-signals.

The Second Controller

FIG. 1A also shows a second controller 15B that comprises a second actuator 16B and a second rectifier 18B that is shown to be electrically-connected between the other power-wire 12 and the second distribution-wire 21; the effect being as follows.

When the second controller 15B is closed, its operation is such that when the power-wire 12 has its positive polarity (which happens cyclically and alternately as mentioned above), the voltage impressed by the power-source 10 causes the second rectifier 18B to become electrically conductive; and electricity then flows from power-wire 12, through rectifier 18B, to the second distribution-wire 21. Thus, the second distribution-wire 21 becomes positive.

Simultaneously, the instantaneous negative-polarity on power-wire 11 is transmitted through the closed controller 15b to the first distribution-wire 20.

Closing the controller 15B also produces an associated control-signal that has three signal-component characteristics. First of all, closing the controller 15B causes it to select distribution-wire 21 to be the control-wire that is to transmit the control-signal associated with controller 15B. Second, closing the controller 15B causes it to select distribution-wire 20 to be the return-wire for the control-signal associated with controller 15B. Third, closing the controller 15B causes its associated control-signal to have a positive polarity on control-wire 21. Thus, the power-source 10 powers controller 15B to produce an associated control-signal that may be identified as "Positive 21/Negative 20" (P21/N20) — as contrasted to the P20/N21 control-signal first discussed.

Thus, each controller 15A and 15B is adapted to produce its own individual control-signal; and the usage of these control-signals will be discussed later.

The Third Controller

Directing attention again to FIG. 1A, it will be seen that a third controller 15C comprises a third actuator 16C and a third rectifier 18C that is connected between power-wire 11 and a third distribution-wire 22. When the third controller 15C is closed, the poling of the third rectifier 18C causes the third distribution-wire 22 to become positive; whereas the second distribution-wire 21 becomes negative. The third controller 15C thus produces an associated control-signal that may be identified as "P22/N21"; and it will be realized that this third control-signal differs from the two control-signals (P20/N21, P21/N20) previously discussed.

The Additional Controllers

FIG. 1A shows additional controllers 15D, 15E, etc.; each of these being adapted — because of its electrical connections to the distribution-wires, and because of the poling of its rectifier — to produce associated control-signals that distinguish from the other control-signals.

For example, the additional controllers 15D, 15E, 15F, 15G, 15H, etc. produce different associated control-signals that may be identified as P21/N22, P22/N20, P20/N22, P23/N22, P22/N23, etc.

Thus, by closing a selected one of the controllers 15, any given distribution-wire of the set of distribution-wires may be given a positive-polarity or a negative-polarity relative to any other distribution-wire of the set of distribution-wires. Stated in another way, any distribution-wire may be selected to act as the control-wire or as the return-wire for a control-signal. This "selectable return-wire" concept is one of the features that permit the use of a minimal number of distribution-wires for the disclosed control-system.

An anaysis will show that two distribution wires can transmit two different control-signals; three distribution wires can transmit six different control-signals; four distribution wires can transmit 12 different control-signals; five distribution wires can transmit 20 different control-signals; eight distribution wires can transmit 56 different control-signals; ten distribution wires can transmit 90 different control-signals; 20 distribution wires can transmit over three hundred control-signals, etc. Thus, by adding controllers and additional distribution wires (as indicated by the set of distribution wires at the righthand edge of FIG. 1A), the number of control-signals may be increased tremendously in relation to the number of distribution wires added.

The controllers 15 may comprise individual components assembled for that particular controller function; or, alternatively, they may comprise unitary devices — such as integrated circuits, etc. — that incorporate relay-type switches and the like, suitable printed wiring board being used for the electrical interconnections.

The First Utilization-Device

As indicated above in connection with FIG. 1A, a plurality of different control-signals may be readily produced and transmitted; and FIG. 1B schematically shows a portion of the control system that is devoted to the utilization of these control-signals. Here, the set of distribution-wires at the lefthand edge correspond to the set of distribution-wires of the previous illustration. A first utilization-device 25A may be one of the previously-discussed sprinkler-valves or the like. Utilization-device 25A is indicated to be of the electrically actuated type; and is shown to be electrically connected to control-wire 20 and to return wire 21 — a "trigger-diode" 26A being shown as part of the electrical-connection between the utilization-device 25A and distribution-wire 20.

The action of a trigger-diode, such as 26A, is such that it is normally electrically non-conductive; but becomes electrically-conductive when a given magnitude of suitable polarity voltage is impressed across it. Thus, the first utilization-device 25A is "tuned" — by its electrical connections and by the polarity of its trigger-diode 26A — to an associated P20/N21 control-signal.

Upon the appearance of such a P20/N21 control-signal (as produced, for example, by controller 15A of FIG. 1A), the trigger-diode 26A becomes electrically-conductive. It thereupon permits its associated control-signal to be applied from the set of distribution-wires to utilization-device 25A — which thereupon acts in its designed manner to turn on the water sprinkler, illuminate a lamp, or the like.

Because of the tuning-effect, only its associated control-signal will be applied to utilization-device 25A; so that the utilization-device 25A is not activated by any other control-signal except the particular associated control-signal to which it is tuned.

The Second Utilization-Device

Directing attention now to the second utilization-device 25B of FIG. 1B, it will be noted that this is tuned to be activated by a P21/N20 control-signal. Because of its tuning, only an associated control-signal will activate utilization-device 25B; so that this second utilization-device is not activated by any other control-signal except the particular associated control-signal to which it is tuned.

Other Utilization-Devices

FIG. 1B shows a plurality of other utilization-devices 25C, 25D, etc.; these being connected and tuned in ways that are similar to those discussed above. An analysis will show that these additional utilization-devices, also, will respond only to the associated specific control-signals to which they are tuned. Thus, the various utilization-devices 25 may be activated by given controllers in a sequential manner, as desired.

It will be noted, that for a given number of distribution-wires, given pluralities of control-signals may be produced and transmitted; and that these pluralities of control-signals are capable of activating a plurality of utilization devices — and that a relatively-small number of distribution-wires can transmit a large plurality of control-signals that can activate a relatively large number of utilization-devices.

Overall Control System

The combination of FIGS. 1A and 1B shows an overall control-system; FIG. 1A showing the production of the control-signals, and FIG. 1B showing the utilization of the control-signals for activating utilization-devices; the disclosed set of distribution-wires transmitting and distributing the control-signals to the utilization-devices. In this way, a relatively small set of distribution-wires is capable of selectively activating a plurality of utilization-devices. This particular characteristic means that a relatively cheap multi-wire electrical-cable (e.g., of the type used for telephone, computer, and communication circuits) may be used; and, moreover, may be passed through relatively small apertures in dividing walls. The disclosed control circuitry thus uses a minimal amount of wire for a control system.

A Second Control-Signal-Producing Circuit

Figure 2A:
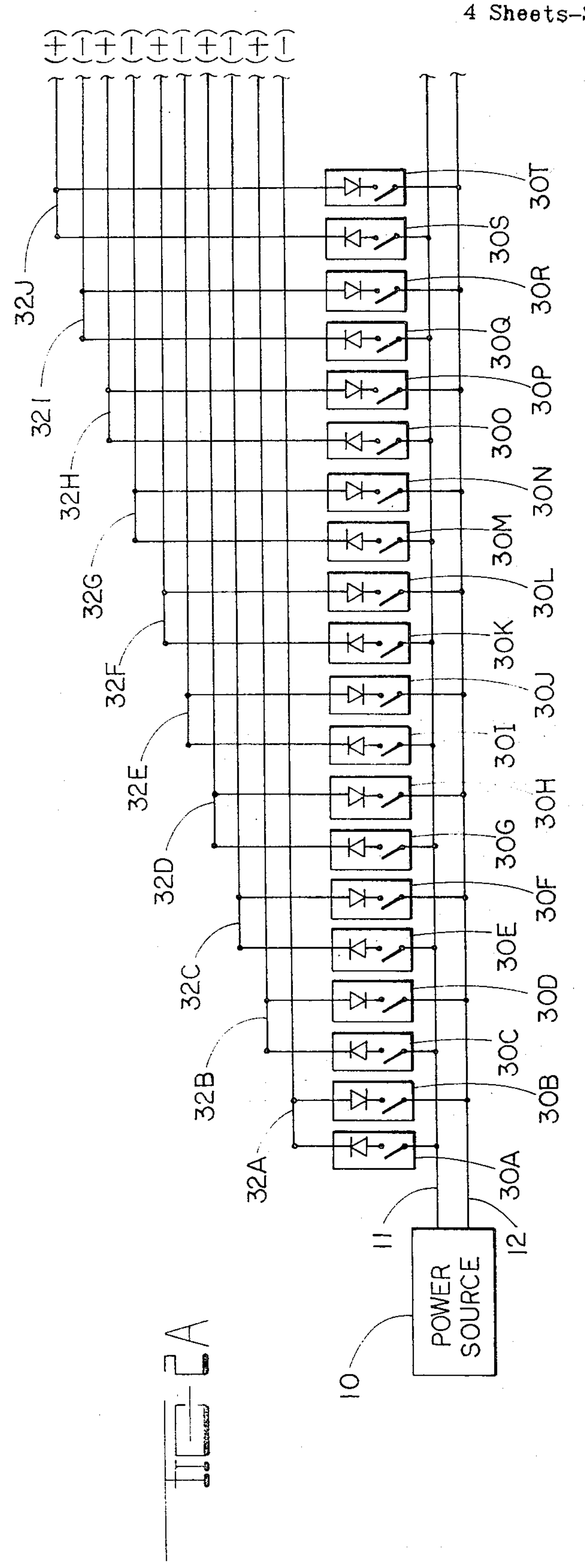
FIG. 2A shows another circuit for producing control signals.

FIG. 2A shows another circuit for the production of control-signals. In this arrangement, a power-source 10 again provides electrical power to power-wires 11 and 12. The plurality of sub-controllers 30A, 30B, 30C, etc. are shown to contain single-pole switches and suitable rectifiers. By closing a controller (comprising any two sub-controllers 30) the closed controller can produce a control-signal having any desired control-wire, any desired return-wire, and any desired polarity — as discussed previously.

One possible polarity relationship for the set of distribution-wires 32A, 32B, 32C, is indicated; this being obtained by closing selected sub-controllers (30B, 30C, 30F, 30G, 30J, 30K, 30N, 30O, 30R, and 30S).

Alternatively, pairs of sub-controllers 30 may be combined to form the double-pole switches discussed previously.

It will be noted that control-signal-producing circuit of FIG. 2A is also of the "selectable return wire" type, since selected distribution-wires 32 may be used as the return-wire for given control-signals; this "selectable return-wire" concept increasing the number of utilization-devices that may be operated from a minimal number of distribution-wires.

Utilization Circuitry (II)

Figure 2B:
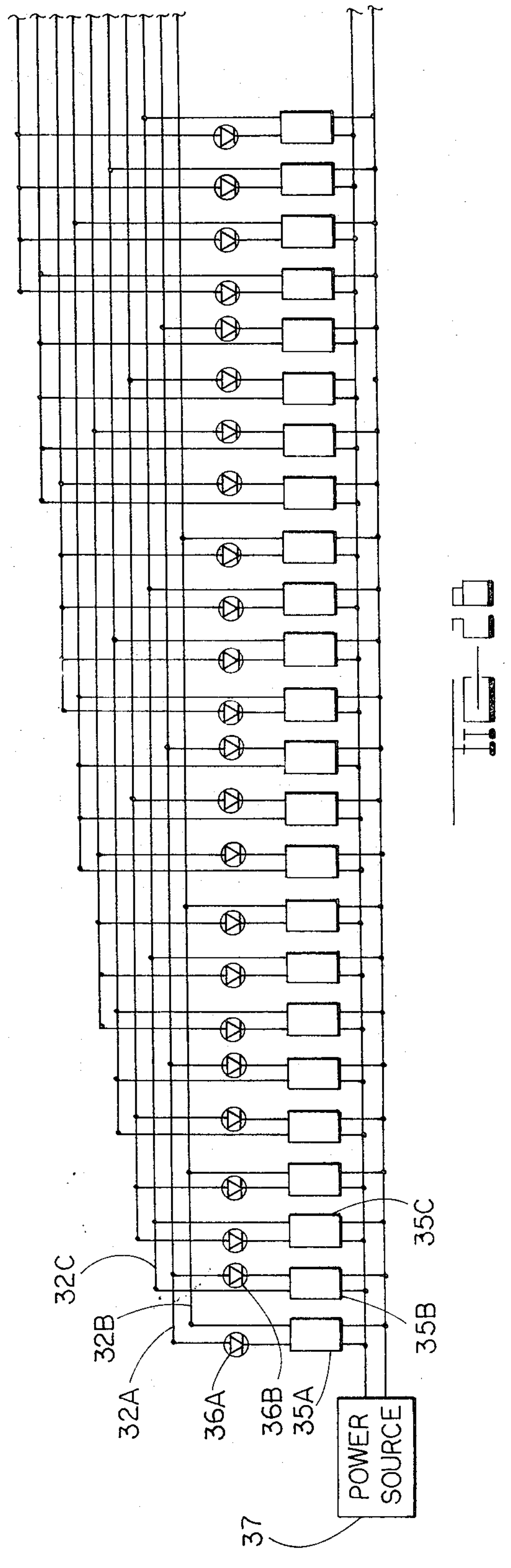
FIG. 2B shows another circuit for utilizing control signals.

Attention is now directed to FIG. 2B; this illustration showing a plurality of utilization-devices 35A, 35B, 35C, that have electrical-connections (comprising — in part — rectifiers 36A, 36B, etc.) connecting the utilization-devices 35 to the distribution wires 32A, 32B, 32C, etc. as discussed above. Thus, as discussed above, each utilization-device 35 is tuned to an associated conrtrol-signal; and is thus activated only by the specific associated control-signal to which it is tuned.

It will be noted, from FIG. 2B, that the utilization-devices 35 are indicated to also be connected to a power-source 37; and this power-source 37 operates as follows. In the utilization-devices previously discussed in connection with FIG. 1B, it was assumed that the power for their operation was obtained from the control-signal. However, at times this is impracticable — as for example, if the utilization-device requires a large electric current (e.g., for powerful lights, heaters, motors, etc.).

In the illustration of FIG. 2B, the control-signals from the distribution-wires 32 merely activate the utilization-devices 35; whereupon the utilization-device 35 takes whatever power it needs from power-source 37.

One example of this type of application would be a string of traffic-lights; and, in such an arrangement, the control-system circuitry would provide the desired sequential activation of the utilization-devices — and local power-sources such as 37 would provide the actual power for the operation of individual traffic-lights or groups thereof.

The addition of the local power-source 37 to the utilization circuitry of FIG. 2B has the additional advantage that, if so desired, a plurality of utilization devices may be activated simultaneously — since with this circuit — sufficient local power is now available to simultaneously operate a number of utilization devices. This allows the control source and power source to be located in different places.

Utilization Device (III)

FIG. 3 shows another utilization circuit that is similar to the ones previously discussed; but this utilization circuit has the advantage of accommodating more utilization devices with a smaller number of distribution wires. It will be recalled that the control systems previously discussed used a three-component control signal; namely a selected control wire, a selected return wire, and a given polarity relation.

The utilization circuitry of FIG. 3 differs in that it uses a similar three-component control signal; but additionally requires a fourth and a fifth signal-component for activating a relay type switch — these additional signal-components comprising an additional control signal having a given polarity and being located on a selected control wire.

The operation of the utilization-circuit of FIG. 3 may be understood from the following explanation. In FIG. 3A, the first utilization-device 39A is tuned, by its trigger-diode 38A, for a P40/N41 control-signal; but its electrical-connection includes a decoupling-switch 42A of the relay type — switch 42A being activated by an electrical coil that responds to a new P43/N41 diode-tuned control-signal that appears on a second control-wire 43 simultaneously with the P43/N41 control-signal that activates the utilization-device 39A. In this way, utilization-device 39A requires an associated composited five-component control-signal for its activation.

It will be noted that the second utilization-device 39B of FIG. 3A is also tuned for a P40/N41 control-signal; and that its electrical connection also includes a decoupling-switch 42B that is activated by a P44/N41 control-signal that appears simultaneously on a second control-wire 44. In this way, the second utilization-device 39B also requires, for its activation, an associated composited five-component control-signal which, however, is different from the composited control-signal of the first utilization-device 39A.

It will be realized that, in actuality, the additional control-signals for the relay-type switches of FIG. 3 use the same return-wire (41) as the control-signal for the utilization-device.

A further analysis of the control-signal utilizing-circuitry of FIGS. 3A and 3B will show that each of the other utilization-devices 39 also requires an associated five-component composited control-signal for its activation. Thus, because of the number of possible permutations and combinations, an eight-wire set of distribution-wires can activate many times as many utilization-devices; whereas the previously discussed eight-wire set of distribution-wires could activate only about half as many utilization-devices.

It will be realized that such five-component control-signals may be obtained from the control-signal producing-circuitry of FIG. 2A by closing three, rather than two, sub-controllers 30. Alternatively, the control-signal producing-circuitry of FIG. 1A may be modified to produce five-component control-signals by the use of a suitably-connected three-pole actuator-switch. In any case, such five-component control-signals are readily obtained.

The Utilization Circuit (V)

Figure 4:
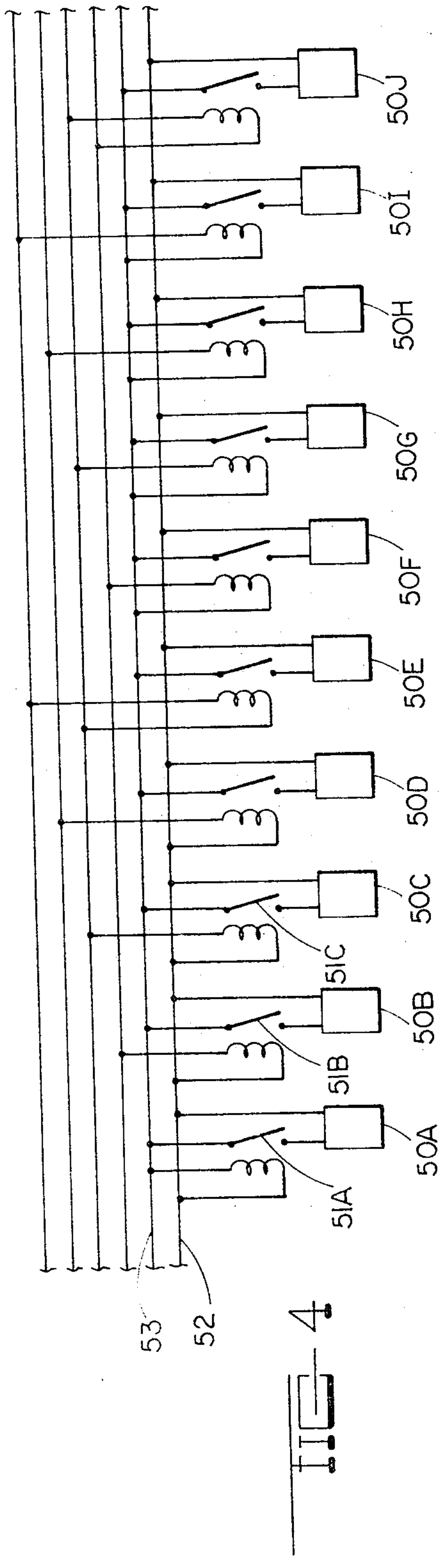

FIG. 4 shows another utilization-circuit wherein all of the utilization-devices 50A, 50B, 50C, etc. have tuning-arrangements including relay-type decoupling-switches 51A, 51B, 51C, etc. The utilization-circuit of FIG. 4 requires a composited control-signal that comprises two complete three-component control-signals; one of these three-component control-signals being used to activate the relay-type switches 52, and the other three-component control-signals being used to activate the utilization-device 50 proper. In this way, each utilization-device is tuned to a different composited six-component control-signal.

For example, in the utilization-circuit of FIG. 4, each utilization-device 50 is illustrated as requiring a 52/53 control-signal; whereas the coils associated with the individual utilization-devices each require a different control-signal. In this way, the disclosed circuit permits an even-larger number of utilization-devices to be used with a given set of distribution-wires.

Utilization Circuit (VI)

Figure 5:
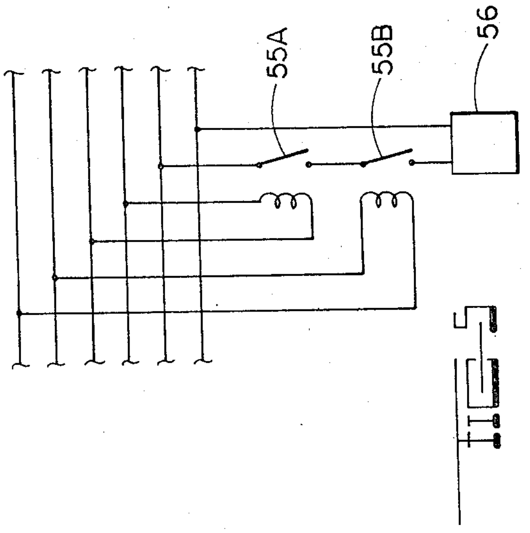

FIG. 5 shows a portion of another utilization circuit wherein a plurality of relay type decoupling-switches such as 55A and 55B are connected in "series"; and the serially-connected switches 55 are used to activate the utilization device 56. In this circuit, a specific three-component control signal is required for each relay 55A and 55B, and a third three-component control signal is required for the utilization device 56 itself. In this way, a composited nine-component control signal — comprising three different complete control signals — is required simultaneously in order to activate the utilization device.

The Utilization Circuit (VII)

The previously described utilization circuits have been explained to activate a selected utilization-device — or, if desired, a plurality of utilization-devices; the operational-duration of the utilization-devices being terminated by the termination of the associated control-signal. However, there are times when it is desirable for the utilization-device to remain activated; and frequently it is desirable for the distribution-wires to be available for other control purposes during this operational interval.

Figure 6:
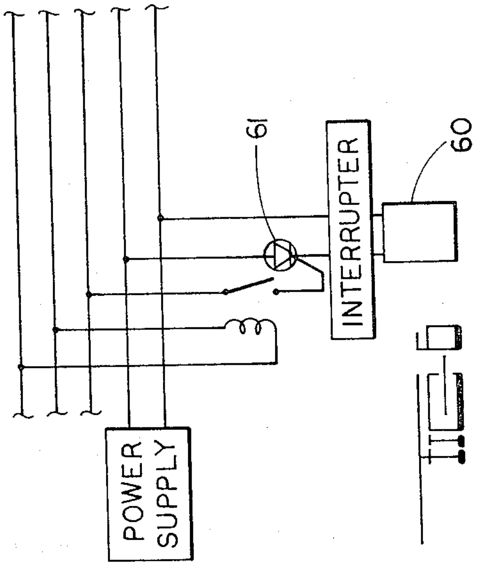

One way to achieve this result is shown in FIG. 6. Here a utilization-device 60 is indicated to be electrically connected to the distribution-wires by means of a control-device 61, such as an electronic component known as a "silicon control rectifier" or a "Triac." These control-devices are normally non-conductive; but when a suitable signal is applied to their gate-electrode, the control-device 61 becomes electrically conductive in the same manner as the diodes and rectifiers discussed above. The control-device 61, however, has the characteristic that it will remain electrically-conductive when the signal to its gate-electrode has been terminated. Thus, if the utilization-device 60 happens to be a lamp, motor, or the like, it will remain activated until the power thereto is interrupted — as by an interrupter 62 — which itself may be activated, deactivated, or controlled in a manner similar to those discussed above.

For example, one usage of this circuit is as follows. It is frequently desirable to show updated status of charts, maps, and the like; the indicating of the instantaneous location of police forces, taxi cabs, fire-fighting apparatus, etc. Other uses of such instantaneous updated displays are games such as keno, checkers, chess, etc. These updated displays may be achieved by the use of electric lamps that are lighted and extinguished as conditions change; and the subject invention permits a plurality of such remotely-located displays to be activated and controlled by a minimal number of distribution-wires.

Miscellaneous Considerations

It will be noted that in FIGS. 4, 5 and 6, the previously-used rectifiers have been omitted; and this omission has been for the purpose of calling attention to the fact that various types of power-sources and control-signals may be desired for different conditions. For example, under some conditions it is desirable to use an A. C. power-source; as this is readily available, and may be used with minimal maintenance. Under this condition, the disclosed rectifiers cause the control-signals to achieve the desired polarity.

Under other conditions, it may be desirable to use a battery as a D. C. power source; as, in some installations, it is more convenient to provide batteries than to provide electrical wiring from an A. C. power-supply. Under this condition, the desired signal-polarity is obtained automatically by suitable connections to the battery; although the disclosed rectifiers do no harm, and may be included in standardized equipment for future conversion to use with an A. C. power-source. Thus, the utilization-devices and/or their coils may be activated by A. C. or by D. C. control-signals. If desired, different values of voltage may be used to further differentiate the control-signals.

Either A. C. or D. C. may be used for powering the utilization-devices.

SUMMARY

The disclosed invention has innumerable advantages over prior art control-systems. First of all, it uses a minimal number of electrical-wires for distributing the control-signals from the signal-producing controllers to the signal-utilizing devices. Second, the distribution-wires may usually be of a smaller size than in prior art systems. Third, the cost of the wires is appreciably lower than the cost in other equivalent systems. Fourth, the controllers for producing the control-signals are relatively simple and economical. Fifth, the utilization-devices may be tuned to be activated only by properly-associated control-signals. Sixth, the control-devices may be designed to be activated by a single control-signal or by a composited control-signal. Seventh, the utilization-devices may be energized by local power-sources; in order to produce a large-power result.

Eighth, the utilization-devices may be designed to be momentarily activated; or to remain activated as long as desired. Ninth, the overall control-system and/or parts thereof may be operated in alternating current or on direct current. And, finally, the disclosed control-system is such that it can be used in many cases where only a small hole is available in a wall that separates the signal-producing controller from the signal-utilizing devices.

I claim:

1. A control system comprising:

A. means for producing a plurality of control-signals;

B. means for utilizing said control-signals;

C. means, comprising a set of distribution-wires, for distributing said control-signals from said control-signals producing-means to said control-signal utilizing means;

D. said control-signal producing-means comprising a plurality of controllers;

a. said controllers being adapted to cause selected distribution-wires of said set of distribution-wires to act as return-wires for selected said control-signals;

b. said controllers being adapted to cause selected distribution-wires of said set of distribution-wires to act as control-wires for selected said control-signals;

c. said controllers being adapted to control the polarity of said control-signals;

wherein limitation "b" comprises first means, including first electrical-connections from respective controllers to selected distribution-wires, for determining the particular distribution-wire that is to act as the control-wire for transmitting the control-signal associated with that particular controller;

wherein limitation "c" comprises second means, including second electrical-connections from respective controllers to selected distribution-wires, for determining the particular distribution-wire that is to act as the return-wire for the control-signal associated with that particular controller.

2. The apparatus of claim 1 including rectifier means, incorporated into one of said electrical-connections, for determining the polarity of the control-signal associated with that particular controller.

3. The apparatus of claim 1 including switch means, incorporated into one of said electrical-connections, for decoupling respective controllers from said distribution-wires.

4. The apparatus of claim 3 wherein said switch-means is adapted to be actuated by an electrical coil.

5. The apparatus of claim 3 wherein said switch-means is adapted to be actuated by a timing mechanism.

6. The apparatus of claim 3 wherein said switch-means is adapted to be actuated by a magnetic force.

7. The apparatus of claim 3 wherein said switch-means comprises a double-pole arrangement having one pole thereof incorporated into each of said electrical-connections.

* * * * *